(No Model.)
C. F. BRUSH.
ELEMENT FOR SECONDARY BATTERIES.
No. 276,348. Patented Apr. 24, 1883.
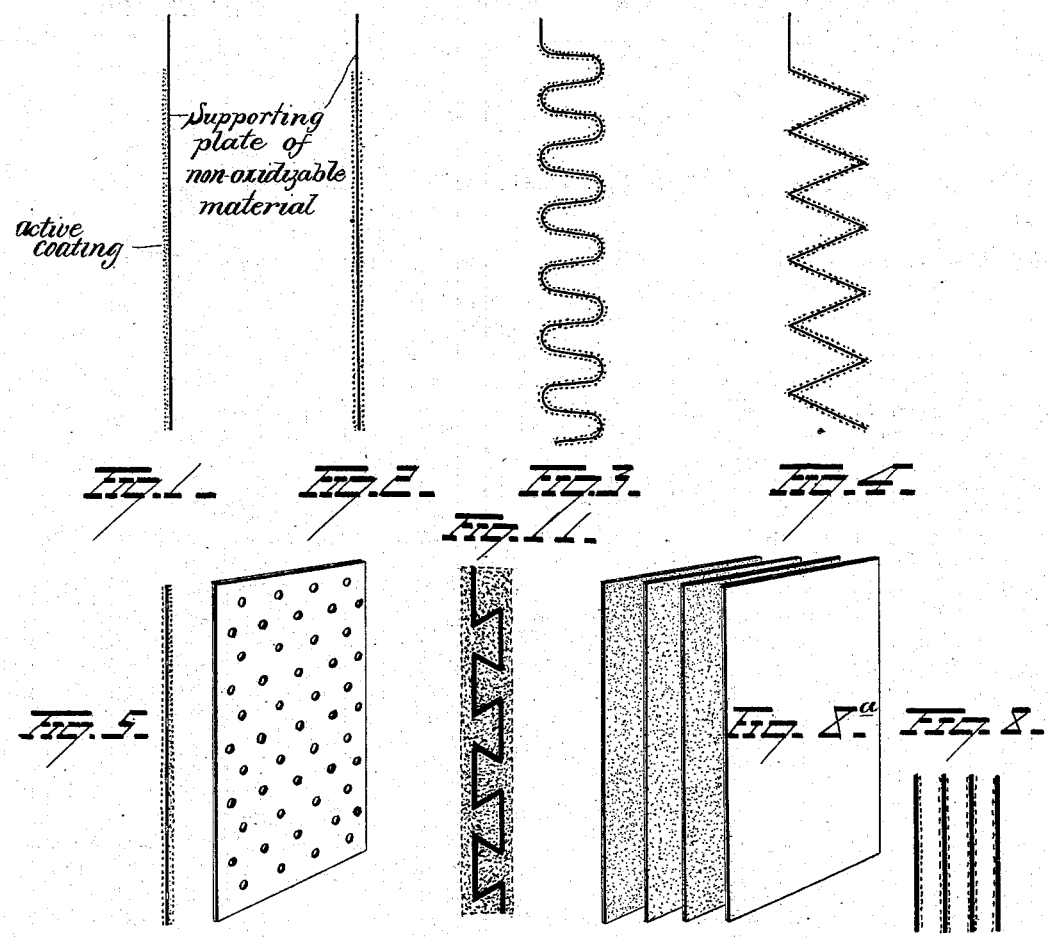
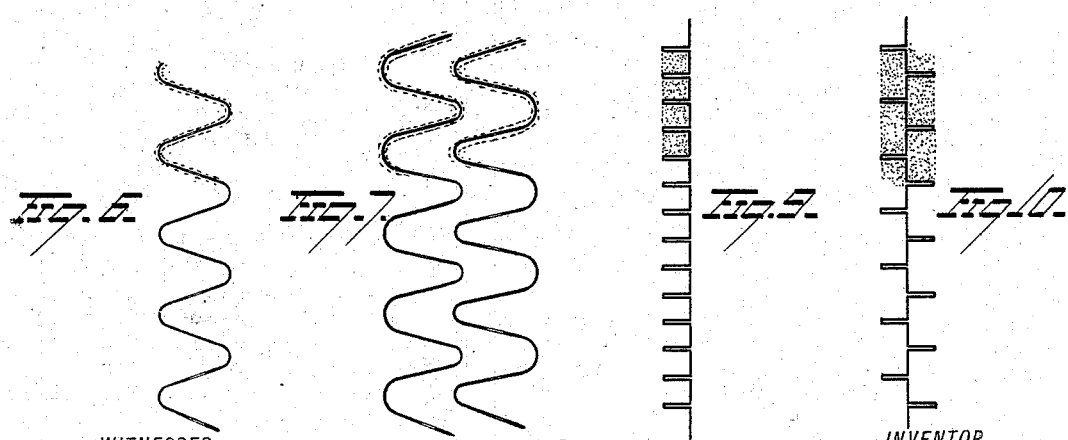

UNITED STATES PATENT OFFICE.

CHARLES F. BRUSH, OF CLEVELAND, OHIO.

ELEMENT FOR SECONDARY BATTERIES.

SPECIFICATION forming part of Letters Patent No. 276,348, dated April 24, 1883.

Application filed June 13, 1882. (No model.)

*To all whom it may concern:*

Be it known that I, CHARLES F. BRUSH, of Cleveland, in the county of Cuyahoga and State of Ohio, have invented certain new and useful Improvements in Elements for Secondary or so-called "Storage" Batteries; and I do hereby declare the following to be a full, clear, and exact description of the invention, such as will enable others skilled in the art to which it pertains make and use the same.

My invention relates to secondary or so-called "electrical storage" batteries, and especially to the elements of such batteries; and said invention consists in an element having a core or body of non-oxidizable material—such as gold, platinum, or equivalent substance—upon which core or body is applied or attached the substance constituting the absorbing or active coating or portion of said element.

It is always desirable in secondary batteries that the elements should present the greatest possible amount of active surface with the smallest possible quantity of the idle material that acts merely as an electro-conducting support for the active portion of said elements; and the objects sought and to a high degree attained by my invention are, first, the reduction to a minimum of the non-acting supporting and conducting portion of the element, and, second, a prevention of the loss of charge by the local action between the active portion of the element and the conducting and supporting portion thereof.

I do not limit myself to any specific form of element, as my invention is equally adaptable, without variation, to elements of indefinite variety of styles. My invention is admirably suited, however, to the construction of elements made up of very thin plates or strips, or to the type that I have styled the "filament" form of element.

I will specify how battery elements of the two kinds last named may be constructed according to my invention.

Take gold, platinum, or other equivalent non-oxidizable material and electro-conducting material, in the form of thin sheets, strips, or wires, and weld, bind, or in any manner apply or attach to one or more of the surfaces of this gold or platinum any suitable substance or compound that can serve as the active or absorbing portion of the finished element. The coating to be applied to the non-oxidizable core may consist primarily of oxide of lead; or it may be a mass consisting primarily of a mixture of metallic lead and lead oxide; or it may be electro-deposited lead or any other known or suitable substance. If a sheet or strip of gold or platinum be used, it may be bent, corrugated, roughened, perforated, slotted, or otherwise prepared; or, if the gold or platinum be in the form of a wire or filament, a number of such wires may be electrically connected together either at one or both of their ends, and assembled in a substantially parallel relation; or they may be twisted into a skein or bunched together in any manner; or they may be woven into a netting or fabric. When the filament form of core is employed the active coating applied around it constitutes an enveloping-tube, and it is in this filament form that I am enabled to obtain in any given space an element presenting a maximum amount of active material, and having a minimum quantity of idle material—that is, material having the function of an electro-conducting support for the so-called "active" or "absorbing" portion of the element.

To insure or assist the adhesion to the supporting-body of the active coating employed therewith, I prefer either to pierce the plate with numerous perforations or to corrugate or emboss it or roughen it in any suitable manner. A number of methods are suggested in the drawings, wherein—

Figure 1 is an edge view of a plate, sheet, or strip of non-oxidizable material provided on one side with an active coating. Fig. 2 is the same provided with a coating of active material on both sides. Figs. 3 and 4 show the same, the plates being corrugated. Fig. 5 is a view in perspective and section of the same, the plate being perforated. Fig. 6 is a perforated corrugated plate of non-oxidizable material provided with an active coating. Fig. 7 is an edge view of corrugated plates, the folds of one entering the folds of the other. Figs. 8 and 8ª represent an assemblage of plates, the center plate being coated on both sides and the end plates only on their inner sides. Figs. 9 and 10 represent plates of non-oxidizable material folded so as to form supporting ribs or shelves for the active coating, and Fig. 11 shows a sectional view of a plate or strip having dovetailed corrugations formed substantially as indicated. When pressure is applied to the coating on this form of plate the coating is firmly grasped and retained against displacement.

For the sake of convenience in distinguishing this among other inventions of mine in the class of secondary batteries, I denominate it as "Case R."

What I claim is—

A secondary-battery element consisting of a core or body of non-oxidizable material—such as gold, platinum, or equivalent substances—provided with a permanent active coating, substantially as set forth.

In testimony whereof I have signed my name to this specification in the presence of two subscribing witnesses.

CHARLES F. BRUSH.

Witnesses:
LEVERETT L. LEGGETT,
ALBERT E. LYNCH.